July 6, 1948.
J. E. BEVINS
2,444,625
RATE OF TURN INDICATOR
Filed March 15, 1943
3 Sheets-Sheet 1
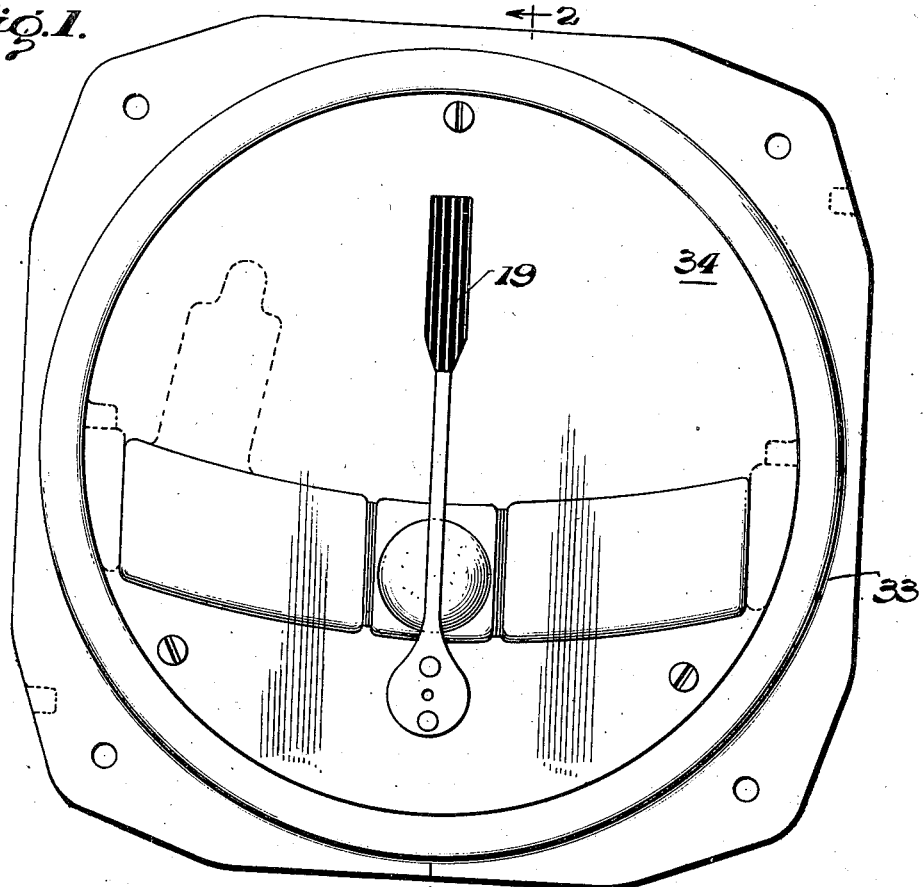
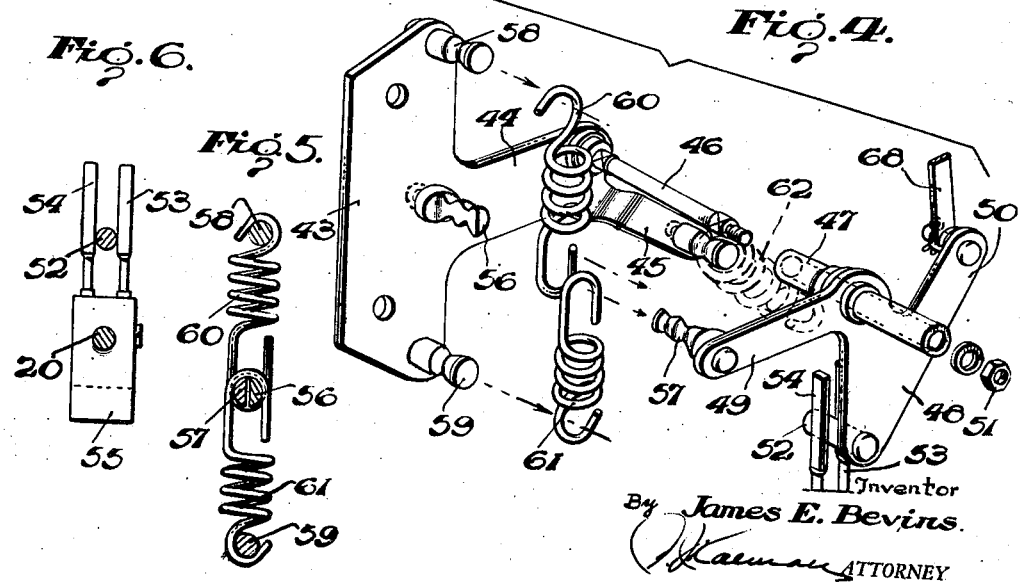
Inventor
By James E. Bevins.
ATTORNEY

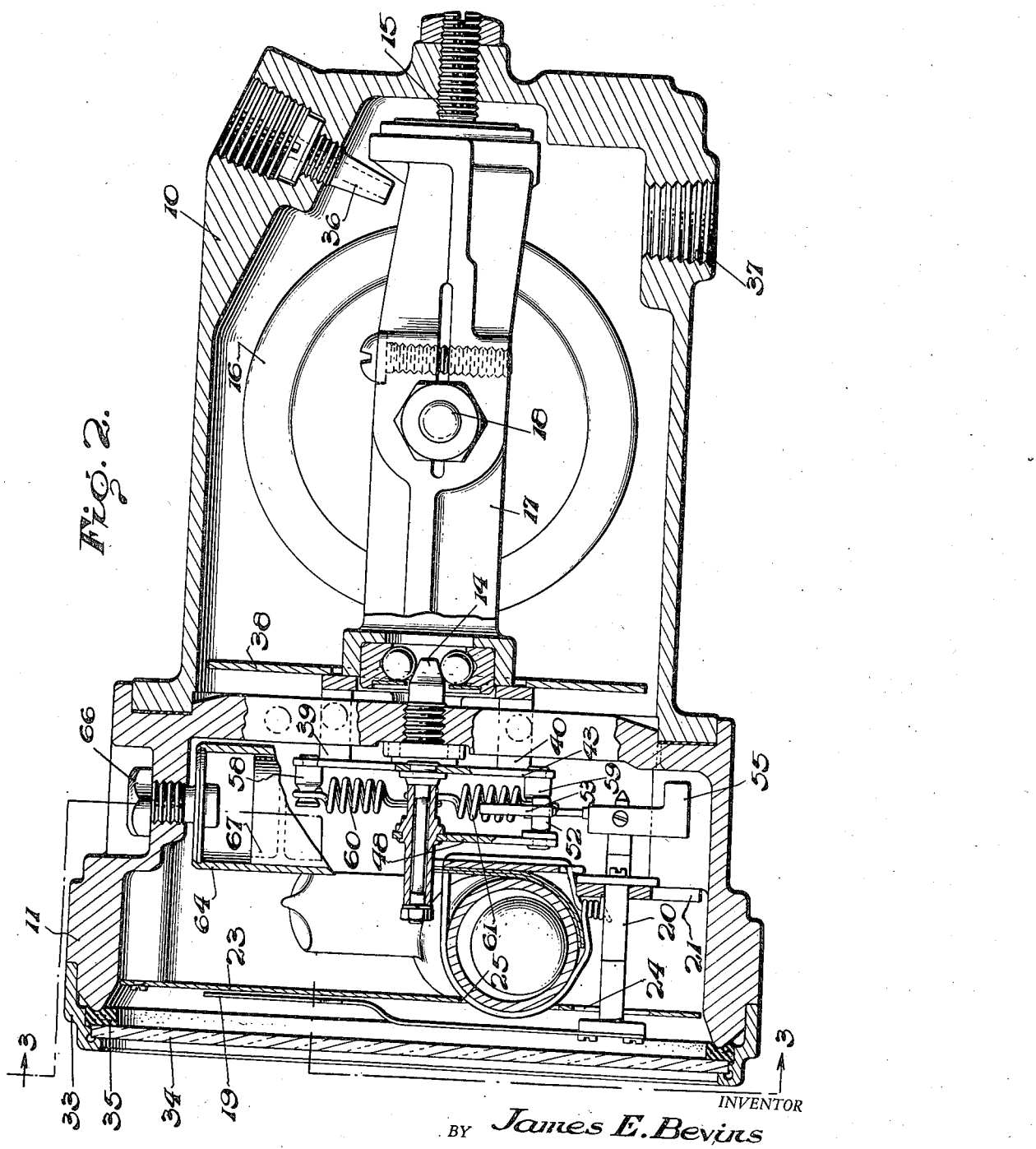

July 6, 1948.

J. E. BEVINS 2,444,625

RATE OF TURN INDICATOR

Filed March 15, 1943

INVENTOR
James E. Bevins.
BY
ATTORNEY

Patented July 6, 1948

2,444,625

UNITED STATES PATENT OFFICE 2,444,625

RATE OF TURN INDICATOR

James E. Bevins, Hackensack, N. J., assignor to Bendix Aviation Corporation, Bendix, N. J., a corporation of Delaware Application March 15, 1943, Serial No. 479,263

8 Claims. (Cl. 33—204)

1

This invention relates to turn indicators for indicating angular movement of a mobile or dirigible vehicle about one of its axes, and more particularly to novel damping means therefor.

In known turn indicators, such as that represented by Patent No. 2,010,191 issued to P. W. Koch et al. on August 6, 1935, and assigned to the assignee of the present application, it has been the practice to connect the gyroscopic element directly to the indicator and provide some form of yieldable restraining means acting upon the direct connection to stabilize the indicator. Although such provision constituted a partial solution of the problem, nevertheless, when "choppy" flying conditions prevailed, gimbal oscillations occurring as a result of rough flying were transmitted, in part at least, through the direct connection to the indicator so that its reading proved blurred and therefore unreliable.

It is an object of the present invention, therefore, to overcome the foregoing disadvantages by providing an improved turn indicator having novel damping means therefor.

Another object of the invention is to provide an improved turn indicator having a novel connection in the form of a yieldable coupling between the gyroscopic element and the pointer thereof whereby the pointer will be substantially stabilized, notwithstanding gimbal vibration resulting from undesirable flying conditions.

A further object of the invention is to provide a turn indicator with novel damping means in the form of a pair of opposed spring members which act to transmit gyroscopic precession to a pointer resulting during a craft turn and which also act to absorb undesirable gimbal vibrations occurring during the presence of rough flying conditions thus leaving the pointer substantially free of gimbal vibration.

Another object is to provide an improved instrument for the purpose described with novel damping mechanism adapted to stabilize the instrument pointer against undesirable vibrations as well as against excess movement and erratic action to thus insure reliable performance.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention.

2

In the drawings, wherein like reference characters refer to like parts throughout the several views, Figure 1 is a front elevation view of one form of turn indicator embodying the subject matter of the present invention;

Figure 2 is a vertical section view taken substantially along line 2—2 of Figure 1;

Figure 4 is an exploded perspective view of the novel damping means of the present invention;

Figure 5 is a side elevation view of a portion of the structure of Figure 4; and Figure 6 is a fragmentary detail view of a portion of the structure of Figure 2.

Figure 3:
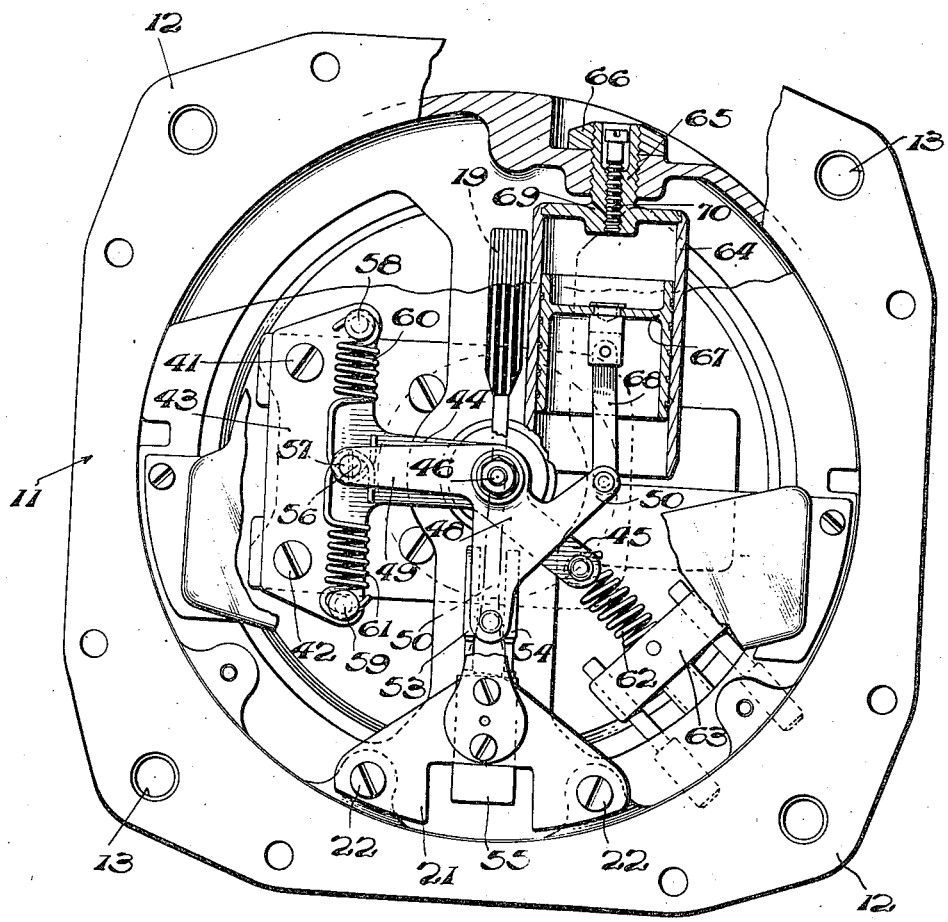
Figure 3 is a vertical section view taken substantially along line 3—3 of Figure 2.

Referring now to the drawings for a more detailed description of the present invention, and more particularly to Figure 2 thereof, the instrument comprises an airtight casing 10 having an enlarged portion 11 which is provided with an annular flange (Fig. 3) having lugs 12 thereon provided with screw receiving apertures 13 therein for mounting the instrument on an instrument panel of an aircraft, for example, the angular motion of which is to be indicated, so that the longitudinal axis of the casing will coincide with or lie parallel to the longitudinal axis of the craft.

Gyroscopic apparatus is mounted in any suitable manner within the casing as by means of adjustable pivots 14, 15 and includes a gyro rotor 16 journalled in a gimbal 17 for rotation about a horizontal axis perpendicular to the axis constituted by pivots 14, 15 in suitable bearings, one of which is shown at 18, so that the gimbal may oscillate about axis 14, 15 due to the precessional forces acting thereon, when the gimbal and casing are turned about an axis perpendicular to both of the first-mentioned axes.

A pointer 19 is provided for indicating the precessional movement of the gyroscope about axes 14, 15 and is carried by a shaft 20 rotatably mounted in a supporting bracket 21 secured to portion 11 by suitable means, such as screws 22 (Fig. 3). The pointer is superimposed for movement over a dial 23 carried by the casing and having an opening 24 at its lower end through which pointer shaft 20 is adapted to extend. Dial 23 is also provided with a transverse arcuate slot 25 (Fig. 2) through which a bank indicator may be viewed as is well known in the art.

A bezel 33 suitably closes the open end of the instrument and supports therein a cover glass 34 which sealably closes off the interior of the instrument from the atmosphere by virtue of a sealing ring 35 arranged between the cover glass and portion 11 of the casing.

A nozzle 36 is provided for spinning rotor 16 about its horizontal spin axis and, as shown in Figure 2, is arranged to direct a fluid stream against peripheral buckets (not shown) formed on the rotor. The fluid is exhausted from casing 10 through an outlet 37. It will be apparent that fluid pressure for driving the rotor may be derived in any other suitable manner as, for example, by connecting a suction pump (not shown) to outlet 37.

After a precessional movement of the gyro rotor and gimbal, it is desirable that both be returned to a normal and central position and, to this end, novel means are provided for centralizing gimbal 17 relative to the casing about axis 14, 15 after the craft has completed a turn, the means being constructed and arranged in such a manner that besides centralizing the gimbal it also serves as damping means for absorbing gimbal oscillation due to rough flying conditions, for example, and thereby prevent the transfer of undesirable oscillation, in a manner to presently appear, to the pointer so that the latter is substantially stabilized to thereby provide a reliable reading.

To this end, gimbal 17 carries a plate 38 which has fastened thereto by means such as spacers 39, 40 and screws 41, 42, a bracket member 43 provided with two integrally formed arms 44 and 45 (Fig. 4). Supported at the extremity of arm 44 is a shaft 46 which receives a relatively movable sleeve member 47 secured to a lever 48, the latter being provided with two substantially diametric arms 49 and 50 (Figures 3 and 4). The outer end of shaft 46 is screw threaded for the reception of a nut 51 thereon which holds lever 48 against longitudinal motion relative to bracket 43. Shaft 46 of bracket 43, moreover, is arranged coaxially with precessional axis 14, 15 so that revolution of the bracket and lever is always about an axis concentric with the precessional axis.

A finger 52 is fastened to and projects outwardly from lever 48 and is arranged to be intermediate a pair of parallel arms 53 and 54 (Fig. 6) which are supported by a weighted block 55, the latter having secured thereto the free end of pointer shaft 20. Motion in either direction on the part of lever 48 is transmitted to pointer 19 by virtue of the arm and finger connection.

In order to transfer gimbal motion in a suitably damped manner from bracket 43 to lever 48, the bracket and lever are provided, respectively, with two cooperating pins 56 and 57, pin 56 being fastened at a substantially central portion of the bracket and pin 57 being fastened to lever arm 49. Bracket 43, furthermore, has fastened thereto lugs 58 and 59, each of which supports the free end of one of two oppositely arranged centralizing springs 60 and 61. The free end of spring 60 is hooked about the bottom of pins 56, 57 while the free end of spring 61 is hooked over the top end of the pins (Fig. 5) so that the two springs define the sole coupling or connection between gimbal 17 and pointer 19. With this novel arrangement springs 60 and 61 will always return the gimbal, following a precessional movement, to a normally centralized position while, during rough flying conditions, gimbal oscillation is absorbed and damped by the springs without being transferred to lever 48 so that pointer 19 remains substantially stabilized.

In addition to the action of centralizing springs 60 and 61 upon the gimbal, the motion of the latter is also restrained yieldably by virtue of a calibration spring 62 (Fig. 3) which is secured at one of its ends to arm 45 of bracket 43 and at its other end is anchored to a block 63 mounted within casing 10 and so arranged as to be adjustable at will for the initial calibration of spring 62. This spring acts through bracket 43 to restrain precessional motion of the gyro to a rate of turn function as is well known in the art of turn indicators.

Supplementing the action of springs 60 and 61 to further increase the reliability of instrument indication, an additional damping means in the form of a dash-pot is provided and comprises a cylinder 64 having a threaded and hollow extension member 65 which is received by casing 10 (Figure 3) and secured thereto by virtue of a nut 66 accessible from the exterior of the casing. Mounted for reciprocal movement within the cylinder is a piston 67 which is provided with a pivotally mounted connecting link 68 securing the piston to arm 50 of lever 48.

The cylinder head is in restricted communication with the interior of the casing by virtue of a vent 69 with which cooperates a valve in the form of a threaded member 70 to vary the amount of the restriction and thus predetermine the amount of damping provided by the dash-pot. By virtue of such dash-pot, upward movement of the piston is yieldably restrained because air flow from the cylinder is metered through vent 69 and downward motion is likewise damped since in this case air flow into the cylinder is metered so that a suction is created above the piston. In this manner motion of lever 48 and, therefore, motion of pointer 19 through springs 60 and 61 is yieldably constrained by the dash-pot and gimbal motion itself is damped before being transmitted to the pointer and also motion due to oscillation of the gimbal resulting from "choppy" weather is eliminated without affecting the pointer.

An improved damping means has been thus provided in which the gimbal drives both the damping piston and cylinder assembly and the pointer through two relatively small centralizing springs 60 and 61 which are mounted in such a manner that they centralize the pointer and gimbal after the completion of a craft turn.

Although but a single embodiment of the present invention has been illustrated and described in detail, it is to be expressly understood that the invention is not limited thereto. Various changes can be made in the design and arrangement of parts without departing from the spirit and scope of the invention, as will now be understood by those skilled in the art. For a definition of the limits of the invention, reference will be had primarily to the appended claims.

I claim:

1. A turn indicator for aircraft comprising a gyroscopic element mounted for precession in accordance with the rate of craft turn, means resiliently constraining precession of said element, an indicator, a driven member for actuating said indicator, means constraining movement of said driven member, a driving member actuated by said rotor precession and pivotally connected to said driven member, and means comprising opposed resilient members whose outer ends are anchored to said driving member and whose inner ends are anchored to said driven member.

2. A turn indicator for aircraft comprising a gyroscopic element mounted for precession in accordance with the rate of craft turn, means yieldably constraining precession of said element, an indicator, a driven member for actuating said indicator, means yieldably opposing movement of said driven member, a driving member actuated by said rotor precession and pivotally connected to said driven member, and a pair of damping springs having their outer ends anchored to said driving member and their inner ends anchored to said driven member to define an operative connection between said driving and driven members.

3. A turn indicator comprising a rotor mounted for spinning about one axis and a gimbal supporting the rotor for precession about a second axis perpendicular to said first axis, means yieldably constraining precession of said rotor, an indicator, a lever for actuating said indicator, means yieldably opposing movement of said lever, a bracket secured to said gimbal and pivotally connected to said lever, and a pair of opposed springs having their outer ends anchored to said bracket and their inner ends anchored to said lever to thereby define an operative connection between said gimbal and said indicator.

4. A turn indicator comprising a rotor mounted for spinning about one axis and a gimbal supporting the rotor for precession about a second axis perpendicular to said first axis, means controlled in accordance with said precession, yieldable means comprising a dash-pot for opposing operation of said controlled means, a bracket secured to said gimbal and pivotally connected to said controlled means, means connected to said bracket for resiliently constraining precession of said rotor, and vibration damping means constituting a driving connection between said bracket and said controlled means, said vibration damping means comprising a pair of opposed spring members having their outer ends anchored to said bracket and their inner ends anchored to said controlled means.

5. In a turn indicator, the combination comprising, a gyro rotor mounted for spinning about one axis, a gimbal supporting the rotor for precession about a second axis perpendicular to said first axis, means for resiliently constraining rotor precession, a driving member movable with said gimbal, a lever pivotally connected to said member coaxial with said gimbal axis, a pair of opposed resilient members interconnecting said member and said lever to oscillate the same about the pivot connection upon movement of said gimbal due to gyro rotor precession, and indicator means driven by said lever to indicate the degree of gyro precession.

6. In a turn indicator, the combination comprising, a gyro rotor mounted for spinning about one axis, a gimbal supporting the motor for precession about a second axis perpendicular to said first axis, means for resiliently constraining rotor precession, a driving member movable with said gimbal, a lever pivotally connected to said member coaxial with said gimbal axis, a pair of opposed resilient members having their outer ends anchored to said member and their inner ends to said lever for interconnecting said member and said lever to oscillate the same about the pivot connection upon movement of said gimbal due to gyro rotor precession, indicator means driven by said lever to indicate the degree of gyro precession, and damper means connected to said lever.

7. A rate of turn responsive device comprising a gyro rotor mounted for spinning about one axis, a gimbal supporting the rotor for precession about a second axis perpendicular to said first axis, means for resiliently constraining precession of said rotor, a driving member movable with said gimbal, a lever pivotally connected to said member coaxially with said gimbal axis, a pair of opposed resilient members interconnecting said member and said lever to oscillate the same about the pivot connection upon movement of said gimbal due to precession of said gyro rotor, and means actuated by said lever in response to and in accordance with the degree of gyro precession.

8. A rate of turn responsive device comprising a gyro rotor mounted for spinning about one axis, a gimbal supporting the rotor for precession about a second axis perpendicular to said first axis, means for resiliently constraining precession of said rotor, a driving member movable with said gimbal, a lever pivotally connected to said member coaxially with said gimbal axis, a pair of opposed resilient members having their outer ends anchored to said member and their inner ends to said lever for interconnecting said member and said lever to oscillate the same about the pivotal connection upon movement of said gimbal due to precession of said gyro rotor, means driven by said lever in response to and in accordance with the degree of gyro precession, and damping means connected to said lever.

JAMES E. BEVINS.

REFERENCES CITED

The following references are of record in the file of this patent:

UNITED STATES PATENTS

| Number | Name | Date |
| --- | --- | --- |
| 917,524 | Bateman | Apr. 6, 1909 |
| 958,274 | Owen | May 17, 1910 |
| 1,165,529 | Morse | Dec. 28, 1915 |
| 1,706,201 | Drexler | Mar. 19, 1929 |
| 1,842,824 | Colvin et al. | Jan. 26, 1932 |
| 1,900,709 | Henderson | Mar. 7, 1933 |
| 2,189,375 | Sylvander | Feb. 6, 1940 |

FOREIGN PATENTS

| Number | Country | Date |
| --- | --- | --- |
| 75,906 | Austria | 1919 |
| 327,348 | Germany | 1920 |
| 698,675 | France | 1931 |